(12) United States Patent
Lei et al.

(10) Patent No.: US 11,383,166 B2
(45) Date of Patent: Jul. 12, 2022

(54) INTERACTION METHOD OF APPLICATION SCENE, MOBILE TERMINAL, AND STORAGE MEDIUM

(71) Applicant: TENCENT TECHNOLOGY (SHENZHEN) COMPANY LIMITED, Shenzhen (CN)

(72) Inventors: Xiang Lei, Shenzhen (CN); Feng Li, Shenzhen (CN); Yidong Xiong, Shenzhen (CN); Hao Lu, Shenzhen (CN); Chen Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 74 days.

(21) Appl. No.: 17/027,038

(22) Filed: Sep. 21, 2020

(65) Prior Publication Data
US 2021/0001228 A1 Jan. 7, 2021

Related U.S. Application Data

(63) Continuation of application No. PCT/CN2019/091402, filed on Jun. 14, 2019.

(30) Foreign Application Priority Data

Aug. 28, 2018 (CN) .......................... 201810989371.5

(51) Int. Cl.
*A63F 13/655* (2014.01)
*A63F 13/213* (2014.01)
*A63F 13/52* (2014.01)

(52) U.S. Cl.
CPC .......... *A63F 13/655* (2014.09); *A63F 13/213* (2014.09); *A63F 13/52* (2014.09)

(58) Field of Classification Search
None
See application file for complete search history.

(56) References Cited

U.S. PATENT DOCUMENTS 9,873,038 B2 1/2018 Hooke et al.
10,223,838 B2 * 3/2019 Devries ................. G06T 19/006
(Continued)

FOREIGN PATENT DOCUMENTS

CN 101393599 B 2/2012
CN 104656893 A 5/2015
(Continued)

OTHER PUBLICATIONS

The World Intellectual Property Organization (WIPO) International Search Report for PCT/CN2019/091402 Sep. 12, 2019 5 Pages (including translation).
(Continued)

*Primary Examiner* — James S. McClellan
*Assistant Examiner* — Peter J Iannuzzi
(74) *Attorney, Agent, or Firm* — Anova Law Group, PLLC

(57) ABSTRACT

An interaction method is provided for a mobile terminal. The method includes performing real-time image acquisition on a target face by using a camera configured on the mobile terminal, to obtain a first frame of image and a second frame of image, the first frame of image and the second frame of image being two successive frames of images that are separately captured; comparing the first frame of image with the second frame of image, to obtain an action of the target face and a corresponding amplitude; generating a control instruction of a simulated object in an interactive application scene according to the action of the target face and the corresponding amplitude, the simulated object and an interactive item being displayed in the inter-
(Continued)

active application scene; and controlling, according to the control instruction, the simulated object to interact with the interactive item in the interactive application scene.

20 Claims, 9 Drawing Sheets

(56) References Cited

U.S. PATENT DOCUMENTS

| | | | |
|---|---|---|---|
| 2009/0079813 A1 | 3/2009 | Hildreth | |
| 2013/0023337 A1 | 1/2013 | Bowers et al. | |
| 2013/0045801 A1* | 2/2013 | Takehiro | H04N 7/17318 463/36 |
| 2015/0346495 A1 | 12/2015 | Welch et al. | |
| 2016/0136516 A1 | 5/2016 | Hooke et al. | |
| 2019/0155397 A1 | 5/2019 | Liu et al. | |
| 2019/0265832 A1* | 8/2019 | Chan | G06F 3/0412 |

FOREIGN PATENT DOCUMENTS

| | | |
|---|---|---|
| CN | 105307737 A | 2/2016 |
| CN | 105630169 A | 6/2016 |
| CN | 106249882 A | 12/2016 |
| CN | 106951069 A | 7/2017 |
| CN | 108153422 A | 6/2018 |
| CN | 108255304 A | 7/2018 |
| CN | 109224437 A | 1/2019 |
| JP | 4553346 B2 | 9/2010 |
| JP | 2010541398 A | 12/2010 |
| JP | 2013039231 A1 | 2/2013 |
| JP | 2014044729 A1 | 3/2014 |
| JP | 2016057947 A | 4/2016 |

OTHER PUBLICATIONS

The State Intellectual Property Office of the People's Republic of China (SIPO) Office Action 1 for 201810989371.5 dated Oct. 22, 2019 10 Pages (including translation).

The European Patent Office (EPO) The Extended European Search Report for 19854820.8 dated Sep. 27, 2021 11 Pages (including translation).

The Japan Patent Office (JPO) Notification of Reasons for Refusal for Application No. 2020-572602 and Translation dated Oct. 26, 2021 14 Pages.

\* cited by examiner

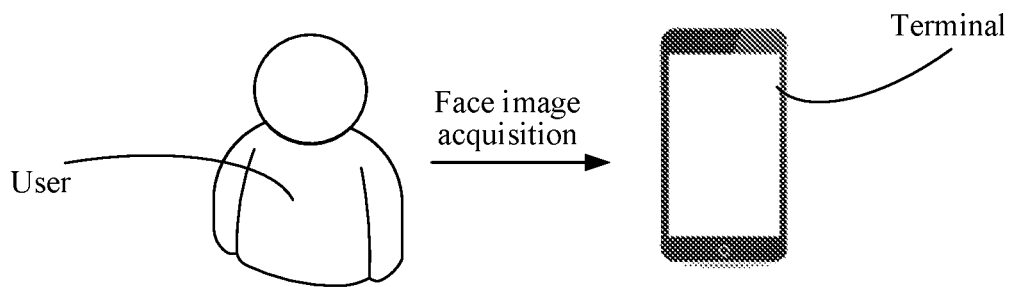

FIG. 1

```
┌─────────────────────────────────────────────────────────────┐
│ A mobile terminal performs real-time image acquisition on a │ ─── 201
│ target face by using a camera configured on the mobile       │
│ terminal, to obtain a first frame of image and a second      │
│ frame of image, the first frame of image and the second     │
│ frame of image being two successive frames of images         │
│ that are separately captured                                 │
└─────────────────────────────────────────────────────────────┘
                              │
                              ▼
┌─────────────────────────────────────────────────────────────┐
│ The mobile terminal compares the first frame of image with  │ ─── 202
│ the second frame of image, to obtain an action of the target│
│ face and a corresponding amplitude                           │
└─────────────────────────────────────────────────────────────┘
                              │
                              ▼
┌─────────────────────────────────────────────────────────────┐
│ The mobile terminal generates a control instruction of a    │ ─── 203
│ mock object in an interactive application scene according to│
│ the action of the target face and the corresponding          │
│ amplitude, the mock object and an interactive item being    │
│ displayed in the interactive application scene              │
└─────────────────────────────────────────────────────────────┘
                              │
                              ▼
┌─────────────────────────────────────────────────────────────┐
│ The mobile terminal controls, according to the control      │ ─── 204
│ instruction, the mock object to interact with the interactive│
│ item in the interactive application scene                    │
└─────────────────────────────────────────────────────────────┘
```

FIG. 2

INTERACTION METHOD OF APPLICATION SCENE, MOBILE TERMINAL, AND STORAGE MEDIUM

RELATED APPLICATIONS

This application is a continuation application of PCT Patent Application No. PCT/CN2019/091402, filed on Jun. 14, 2019, which claims priority to Chinese Patent Application No. 201810989371.5, entitled "INTERACTION METHOD OF APPLICATION SCENE, TERMINAL, AND STORAGE MEDIUM" filed with the National Intellectual Property Administration, PRC on Aug. 28, 2018, which is incorporated by reference in its entirety.

FIELD OF THE TECHNOLOGY

This application relates to the field of computer technologies and, in particular, to an interaction method of an application scene, a mobile terminal, and a storage medium.

BACKGROUND

A computer simulation system can create a virtual world and make users experience the virtual world. The system generates a simulated environment by using a computer, that is, a multi-source information fusion-based system simulation with a three-dimensional dynamic view and an entity behavior that are interactive, so that users are immersed in the virtual environment.

At present, mobile game applications are popular. A characteristic of a mobile game is to allow players to perform operational interaction in the game, for which the players need to interact with a touch screen of a terminal with a finger. In a current mobile game, users still need to perform game interaction with a touch screen using fingers, for example, complete game interaction through operations such as clicking the touch screen with a finger, or operating a button of a gamepad with a finger, or sliding a finger over the touch screen. However, under certain circumstances, using fingers to interact with the terminal might be inconvenient or impractical. The disclosed methods and systems are directed to solve one or more problems set forth above and other problems.

SUMMARY

Embodiments of the present disclosure provide an interaction method of an application scene, a mobile terminal, and a storage medium, to implement immersive interaction on the mobile terminal.

According to one aspect of the present disclosure, an interaction method is provided for a mobile terminal. The method includes performing real-time image acquisition on a target face by using a camera configured on the mobile terminal, to obtain a first frame of image and a second frame of image. The first frame of image and the second frame of image are two successive frames of images that are separately captured. The method also includes comparing the first frame of image with the second frame of image, to obtain an action of the target face and a corresponding amplitude; generating a control instruction of a simulated object in an interactive application scene according to the action of the target face and the corresponding amplitude, the simulated object and an interactive item being displayed in the interactive application scene; and controlling, according to the control instruction, the simulated object to interact with the interactive item in the interactive application scene.

According to another aspect of the present disclosure, a mobile terminal is provided. The mobile terminal includes a memory storing computer program instructions, and a processor coupled to the memory. When executing the computer program instructions, the processor is configured to perform: performing real-time image acquisition on a target face by using a camera configured on the mobile terminal, to obtain a first frame of image and a second frame of image, the first frame of image and the second frame of image being two successive frames of images that are separately captured; comparing the first frame of image with the second frame of image, to obtain an action of the target face and a corresponding amplitude; generating a control instruction of a simulated object in an interactive application scene according to the action of the target face and the corresponding amplitude, the simulated object and an interactive item being displayed in the interactive application scene; and controlling, according to the control instruction, the simulated object to interact with the interactive item in the interactive application scene.

According to another aspect of the present disclosure, a non-transitory computer-readable storage medium is provided. The non-transitory computer-readable storage medium stores computer program instructions executable by at least one processor to perform: performing real-time image acquisition on a target face by using a camera configured on the mobile terminal, to obtain a first frame of image and a second frame of image, the first frame of image and the second frame of image being two successive frames of images that are separately captured; comparing the first frame of image with the second frame of image, to obtain an action of the target face and a corresponding amplitude; generating a control instruction of a simulated object in an interactive application scene according to the action of the target face and the corresponding amplitude, the simulated object and an interactive item being displayed in the interactive application scene; and controlling, according to the control instruction, the simulated object to interact with the interactive item in the interactive application scene.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may derive other drawings from the accompanying drawings.

FIG. 1 is a schematic diagram of a scenario of interaction between a user and a mobile terminal according to an embodiment of the present disclosure;

FIG. 2 is a schematic block flowchart of an interaction method of an application scene according to an embodiment of the present disclosure;

DESCRIPTION OF EMBODIMENTS

Figure 3:
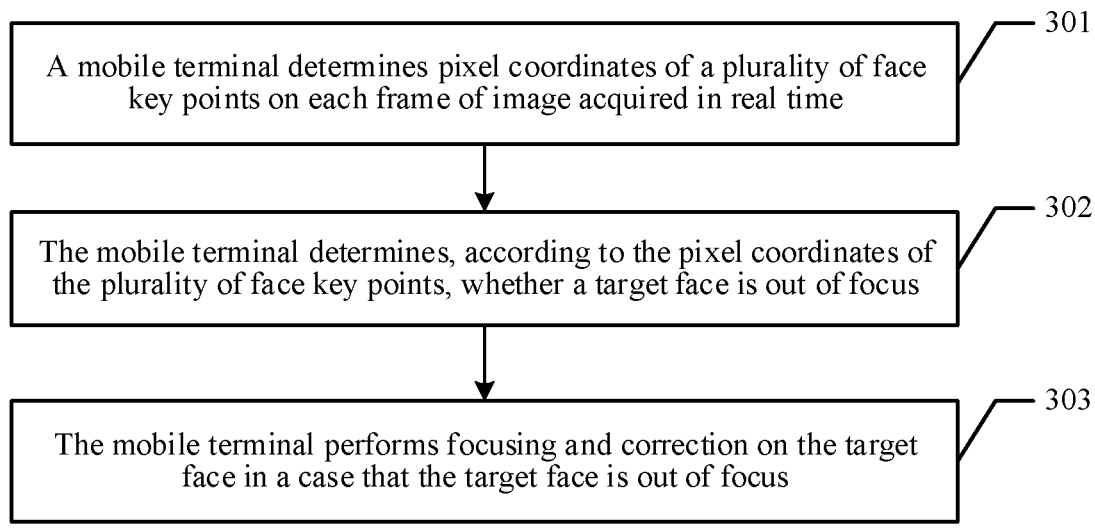
FIG. 3 is a schematic block flowchart of another interaction method of an application scene according to an embodiment of the present disclosure.

Embodiments of the present disclosure provide an interaction method of an application scene, a terminal, and a storage medium, to implement immersive interaction on the mobile terminal.

To make the inventive objectives, features, and advantages of the present disclosure clearer and more comprehensible, the following describes the technical solutions in the present disclosure with reference to the accompanying drawings. Apparently, the embodiments described are merely some rather than all of the embodiments of the present disclosure. Other embodiments obtained by a person skilled in the art based on the embodiments of the present disclosure shall fall within the protection scope of the present disclosure.

The terms "include", "have", and any other variants thereof in the specification, claims, and accompanying drawings of the present disclosure are intended to cover a non-exclusive inclusion, so that a process, a method, a system, a product, or a device that includes a series of units is not necessarily limited to those units, but may include other units not expressly listed or inherent to such a process, method, product, or device.

FIG. 1 shows a schematic diagram of a scenario of interaction between a user and a mobile terminal according to an embodiment of the present disclosure. A mobile terminal (terminal for short) may interact with a user. The terminal may be a mobile phone, a tablet computer, an ebook reader, a moving picture experts group audio layer III (MP3) player, a moving picture experts group audio layer IV (MP4) player, a laptop portable computer, a desktop computer, or the like.

The terminal is equipped with a camera, and the camera may be specifically a front-facing camera. The camera may acquire a face image of the user. The terminal performs the interaction method of an application scene provided in one embodiment of the present disclosure, to capture face images of a user frame by frame by using the camera while keeping compatibility with an input interaction method of an existing mobile terminal, calculate an action made by the user and a corresponding amplitude by comparing face data of two successive frames, and correspondingly generate control instructions in different interactive application scenes. Interaction between a simulated object and an interactive item in the interactive application scenes may be implemented based on the control instructions. Thus, accuracy and smoothness of face control may be greatly improved, so that a new interaction method without any finger operation becomes possible. The interaction method is applied to emphasizing an immersive experience. Because no operation of touching a screen with a finger for interaction is needed, and an interactive operation is performed by completely using facial expression recognition, a sense of immersion of the user can be greatly improved.

Detailed descriptions are provided below from the perspective of the mobile terminal. An embodiment of the interaction method of an application scene of the present disclosure may be specifically applied to face image-based interaction detection. FIG. 2 is a schematic flowchart of an interaction method of an application scene according to an embodiment of the present disclosure. Referring to FIG. 2, the interaction method of an application scene according to an embodiment of the present disclosure may include the followings.

201. A mobile terminal performs real-time image acquisition on a target face by using a camera configured on the mobile terminal, to obtain a first frame of image and a second frame of image, the first frame of image and the second frame of image being two successive frames of images that are separately captured.

In one embodiment of the present disclosure, the terminal is equipped with a camera. Initialization is performed on the camera of the mobile terminal first. After the initialization is completed, the camera is started to acquire an object image appearing in a field of view of the camera. In a case that the object image is recognized as a face image of a user, a face of the user is photographed as the target face in real time, and images captured at different frame time points are generated. The camera mounted on the terminal in one embodiment of the present disclosure may be a rear-facing camera or a front-facing camera. The terminal obtains the first frame of image and the second frame of image first that are to be processed, each frame of image may be the face image generated by photographing the face of the user by using the camera, and the face image in one embodiment of the present disclosure may also be referred to as a facial image, a head image, or the like.

In one embodiment of the present disclosure, when the camera acquires images at different frame time points, images at a plurality of frame time points may be obtained. To differentiate the foregoing images at the plurality of frame time points, an image captured by the camera at a first frame time point is defined as the first frame of image, and an image captured by the camera at a second frame time point is defined as the second frame of image, the first frame of image and the second frame of image only being used for differentiating the images captured by the camera at different frame time points.

In one embodiment of the present disclosure, feature points of the first frame of image may be obtained by performing detection and calculation of feature points on the first frame of image captured at the first frame time point, and feature points of the second frame of image may be obtained by performing detection and calculation of feature points on the second frame of image captured at the second frame time point. Feature points of an image play a very important role in a feature point-based image matching algorithm. The feature points of an image can reflect essential features of the image, and can identify a target object in the image. Image matching may be completed through matching of the feature points. In one embodiment of the present disclosure, the feature points of an image may be local image feature points, and there may be a plurality of implementations for extraction of the feature points of the first frame of image and the second frame of image, for example, extraction of feature points of Oriented Binary Robust Independent Elementary Features (ORB), or extraction of Speeded Up Robust Features (SURF), or extraction of Scale-Invariant Feature Transform (SIFT). Therefore, the local image feature points in one embodiment of the present disclosure may be ORB feature points, SURF feature points, or SIFT feature points. Faces in frames of images may be recognized by detecting the feature points. For example, five sense organs may be recognized by detecting the feature points, and the five sense organs may be used as face positioning points.

In some embodiments of the present disclosure, before a mobile terminal performs real-time image acquisition on a target face by using a camera configured on the mobile terminal in step 201, the method according to the embodiments of the present disclosure further includes: detecting, by the mobile terminal, whether a touch input is generated on a touch screen of the mobile terminal; and triggering, by the mobile terminal in a case that no touch input is generated on the touch screen, the following step: performing the real-time image acquisition on the target face by using the camera configured on the mobile terminal.

To implement a process of contactless control between the user and the mobile terminal, whether a touch screen generates a touch input is determined first. In a case that it is determined that no touch input is generated on the touch screen, it may indicate that the user does not touch the screen of the mobile terminal with a finger. In this case, the camera of the mobile terminal is started to acquire an image of the user.

202. The mobile terminal compares the first frame of image with the second frame of image, to obtain an action of the target face and a corresponding amplitude.

In one embodiment of the present disclosure, after obtaining the face images of two successive frames, the terminal may determine, according to a position change between the face images in the two successive frames, the action of the target face and the amplitude corresponding to the action. The action of the target face is an action of the user captured by the camera of the terminal. For example, the action may be an up-and-down or left-and-right movement of the face. The amplitude is a moving direction and a moving distance of the action of the face.

For example, in one embodiment of the present disclosure, by comparing the images of the two successive frames, the action of the target face may be recognized as turning the face left and right, corresponding to a left-and-right movement of the face on the screen, and a turning amplitude corresponds to a moving distance on the screen. In another example, by comparing the images of the two successive frames, the action of the face may be recognized as raising the head or lowering the head, corresponding to an up-and-down movement of the face on the screen, and the turning amplitude corresponds to a moving distance on the screen.

In some embodiments of the present disclosure, step 202 in which the mobile terminal compares the first frame of image with the second frame of image, to obtain an action of the target face and a corresponding amplitude includes: determining a first pixel position at which a face positioning point appears in the first frame of image, and a second pixel position at which the face positioning point appears in the second frame of image; comparing the first pixel position with the second pixel position, to obtain a relative displacement between the first pixel position and the second pixel position; and determining the action of the target face and the corresponding amplitude according to the relative displacement between the first pixel position and the second pixel position.

In one embodiment of the present disclosure, after face detection is performed on the plurality of frames of images obtained through capturing the target face in the foregoing steps, a face position in the image may be outputted, and a position indicated by the face position in the image acquired by the camera is in a unit of pixel. Next, detection of face positioning points is performed on the face position. Positioning point features of the face positioning points may be determined in advance in a statistical classification manner, to detect whether there is a pixel position that meets a preset positioning point feature in the face position. In a case that there is a pixel position that meets the positioning point feature in the face position, the pixel position that meets the positioning point feature in the face position is determined as a positioning point position of the face positioning point in the face position. The face positioning point used in one embodiment of the present disclosure is a positioning reference point that is in a face position of a target object and that is used for determining whether the face position turns. In an actual application, the face positioning point may be chosen based on realizable features of the five sense organs in the face position. The face positioning point may be a pixel position of an organ in the face position or pixel positions of a plurality of organs, and this is not limited herein.

A pixel position of a same face positioning point is detected in each frame of image. For example, a pixel position of a face positioning point in the first frame of image is referred to as a first pixel position, and a pixel position of the face positioning point in the second frame of image is referred to as a second pixel position. The two pixel positions in the two frames of images are compared, to determine a relative displacement, and the action and amplitude of the target face is calculated based on the relative displacement.

An up-and-down movement of the face is used as an example. Current coordinates of an eyebrow center point on the face are compared with previous coordinate data of the eyebrow center point. An increase of a Y coordinate indicates raising the head; and a decrease of the Y coordinate indicates lowering the head. A left-and-right movement of the face is used as an example. Current coordinates of a nose tip on the face are compared with previous coordinate data of the nose tip. An increase of an X coordinate indicates turning left; and a decrease of the X coordinate indicates turning right. A back-and-forth movement of the face is used as an example. In a case that a distance between a far corner of the left eye and a far corner of the right eye on the face increases compared with previous data of the distance, it indicates that the face moves forth. In a case that the distance decreases compared with the data, it indicates that the face moves back. A click of the user is used as an example. Current coordinates of a center point on the face are compared with previous coordinate data of the center point. In a case that the coordinates are maintained in specific coordinate ranges for a specific time, it is determined that the face generates a click operation.

203. The mobile terminal generates a control instruction of a simulated object in an interactive application scene according to the action of the target face and the corresponding amplitude, the simulated object and an interactive item being displayed in the interactive application scene.

In one embodiment of the present disclosure, the interactive application scene may be specifically a game scene, or an interactive scene of an application program. For example, the processing method for an interactive application scene provided in one embodiment of the present disclosure may be applied to a scene built for game characters, or may be applied to a scene built for a user object in a software application system. A simulated object is displayed in the interactive application scene in one embodiment of the present disclosure. The simulated object may be a game character in a game scene, or may be a hero or a soldier in a game scene. For example, the simulated object may be a person or a thing controlled by a user in a strategy game, and this is not limited herein. In addition to the simulated object, an interactive item is further displayed in the interactive application scene. The interactive item is an item that can interact with the simulated object in the interactive application scene. The item may be various items in different interactive scenes, for example, a prop in a game scene.

In one embodiment of the present disclosure, after obtaining the action of the target face and the corresponding amplitude, the terminal may map the action and the corresponding amplitude into a control instruction of the simulated object in the interactive application scene. The control instruction may also be referred to as an "interactive instruction". That is, the user performs an action by using the face, the control instruction for the simulated object may be correspondingly generated based on a type and the amplitude of the action, and the simulated object may be controlled by using the control instruction.

In some embodiments of the present disclosure, the following provides descriptions of a locking method for the interactive item in one embodiment of the present disclosure. After step 203 in which the mobile terminal generates a control instruction of a simulated object in an interactive application scene according to the action of the target face and the corresponding amplitude, the method according to one embodiment of the present disclosure further includes: determining, by the mobile terminal according to the control instruction, whether a focus remains stable in an interactive item range for a preset time length, the focus being a reference point at which the target face is mapped into the interactive application scene; and locking, by the mobile terminal, the interactive item in the interactive item range in a case that the simulated object remains stable in the interactive item range for the preset time length.

There is a focus at which the target face is mapped into the interactive application scene, the focus being a reference point at which the face of the user is mapped into the interactive application scene. Whether the focus is in the interactive item range is first determined by using the control instruction, the interactive item range being a range of a specific area size in which the interactive item is located in the interactive application scene. Only in a case that the focus enters the interactive item range, the simulated object can interact with the interactive item. In a case that the focus is outside the interactive item range, the simulated object cannot interact with the interactive item. Whether a time length during which the simulated object remains stable in the interactive item range reaches the preset time length is determined. If the preset time is represented by x seconds, in a case that a fixed point is maintained in a specific range for x seconds, a corresponding interactive item in the screen is determined, a focus is locked, and the corresponding operation is completed. It may be understood that, in the interactive application scene, a default configuration may be used for locking of the interactive item, or in a case that there are a plurality of interactive items, the interactive items may be locked by using a distance between the focus and the interactive item range. The locked interactive item is an item that the simulated object needs to interact with.

204. The mobile terminal controls, according to the control instruction, the simulated object to interact with the interactive item in the interactive application scene.

In one embodiment of the present disclosure, after the terminal generates the control instruction, the terminal may control, according to the control instruction, an interaction manner in which the simulated object interacts with the interactive item. In one embodiment of the present disclosure, there may be a plurality types of interactive behaviors between the simulated object and the interactive item according to different settings of the interactive application scene. For example, the interactive application scene is a fish eating game. The interactive item is a fish prop that is set in a game scene. In a case that the control instruction generated through the foregoing embodiments is opening the mouth, a game character (such as the mouth) may be controlled to start opening the mouth to eat fish, thereby implementing interaction between the game character and the interactive item. In one embodiment of the present disclosure, the control instruction of the simulated object is generated through image detection. A contactless control form is adopted in the whole process, and a first person view is used for enhancing a sense of immersion and bringing unique game experience.

In some embodiments of the present disclosure, step 204 in which the mobile terminal controls, according to the control instruction, the simulated object to interact with the interactive item in the interactive application scene includes: calculating the distance between the focus and the interactive item in real time, the focus being a reference point at which the target face is mapped into the interactive application scene; determining, according to the distance calculated in real time, whether the focus is in an interactive item range; updating, according to the distance calculated in real time, a displacement rate corresponding to the focus in a case that the focus is in the interactive item range; and updating the control instruction according to the updated displacement rate, and controlling, by using the updated control instruction, the simulated object to interact with the interactive item.

In a case that the simulated object is controlled to interact with the interactive item, the terminal may calculate the distance between the simulated object and the interactive item in real time, may determine, according to the distance, whether the focus is in the interactive item range, and can perform, only in a case that the focus is in the interactive item range, a subsequent interaction procedure. In a case that the focus is not in the interactive item range, interaction cannot be performed. In a case that the focus is in the interactive item range, the displacement rate corresponding to the focus is updated according to the distance calculated in real time.

That is, the displacement rate corresponding to the focus may be updated in real time according to a real-time change of the distance, and the control instruction may be updated according to the displacement rate updated continuously, so that the control instruction may be used for controlling the interaction between the simulated object and the interactive item. For example, in a case that the displacement rate corresponding to the focus changes, the simulated object may perform a real-time displacement according to the control instruction. In different application scenes, the interaction method between the simulated object and the interactive item may be determined according to specific scenes.

Optionally, in some embodiments of the present disclosure, after the distance between the focus and the interactive item is calculated in real time, the displacement rate corresponding to the focus may be updated according to a real-time changing situation of the distance, to update the displacement rate in real time, so that a magnetic effect and a damping effect may be implemented. Specifically, the updating, according to the distance calculated in real time, the displacement rate corresponding to the focus includes: reducing the displacement rate first and then increasing the displacement rate in a moving direction of the focus in a case that the distance between the focus and the interactive item decreases; or reducing the displacement rate in a moving direction of the focus first and then increasing the displacement rate in a direction opposite to the moving direction in a case that the distance between the focus and the interactive item increases.

The terminal may adopt a magnetic focusing manner. That is, the distance between the simulated object and the interactive item may be calculated in real time, and in a state that the focus is in the interactive item, in a case that the distance between the focus and the interactive item decreases, the displacement rate may be reduced first and then be increased in a moving direction of the focus, so that movement resistance against the focus leaving from the interactive item is increased, and the displacement rate corresponding to the focus is dynamically adjusted. The control instruction is updated based on the increased movement resistance, so that the control instruction may generate an attraction effect of an interaction point, thereby reducing difficulty in performing an item interaction operation and improving accuracy.

Figure 4:
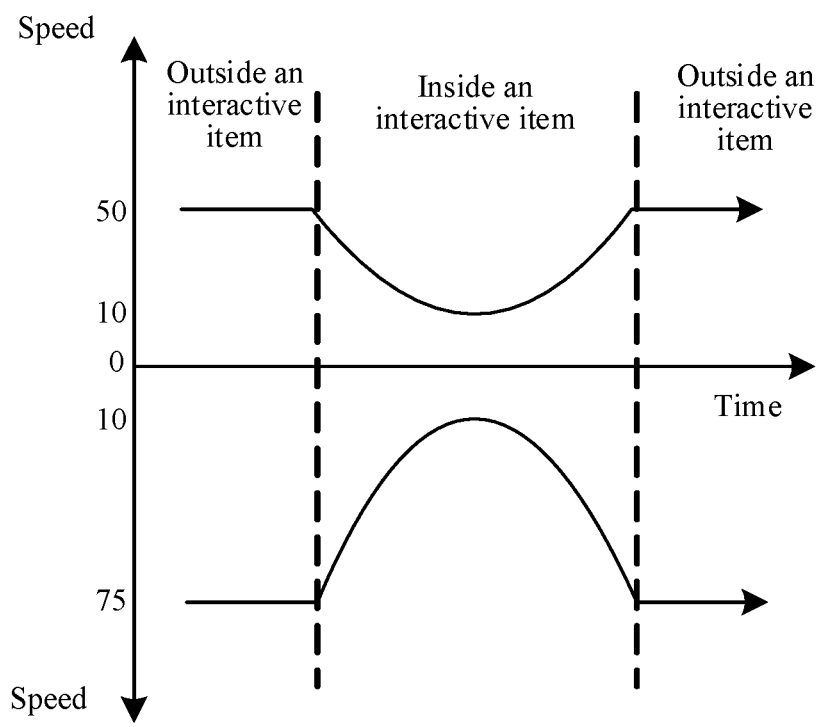
FIG. 4 is a schematic diagram of a magnetic effect according to an embodiment of the present disclosure.

FIG. 4 is a schematic diagram of a magnetic effect according to an embodiment of the present disclosure. The speed of a simulated object under the control of a control instruction is calculated by using the following formula:

$$\text{Speed} = (\text{initial speed} \times \text{initial direction} - \text{target speed} \times \text{target direction}) \times (\text{current time/total time}) \times \text{magnetic constant}$$

where being outside an interactive item means that a focus at which the face is mapped into a device is outside an interactive item range, and being inside an interactive item means that the focus at which the face is mapped into the device is inside the interactive item range. The initial speed, the initial direction, the target speed, and the target direction are movement data on a screen corresponding to movement of the face. The magnetic constant may be adjusted according to an actual scene. The magnetic constant is used for expanding experience in converting a turning speed of the face to a movement speed of the focus. For example, a value of the magnetic constant may be 1.32. For example, for an interactive item, in a case that a cursor of a face operation approaches, movement resistance is increased. That is, a larger action amplitude is needed for leaving the item. In one embodiment of the present disclosure, accuracy and smoothness of face control are greatly improved through magnetic focusing, making it possible for a game to perform interaction completely relying on facial expression recognition.

In some other embodiments of the present disclosure, when the simulated object is controlled to interact with the interactive item, a terminal may adopt a manner of producing a damping effect. According to the distance between the simulated object and the interactive item calculated in real time, a displacement rate in a moving direction of the focus is reduced first, and then, the displacement rate in a direction opposite to the moving direction is increased in a case that a distance between the focus and the interactive item increases. Whether the displacement rate corresponding to the focus exceeds a threshold is determined. In a case that the displacement rate exceeds the threshold, it indicates that a face operation is too fast, resulting in high-speed displacements in both directions. In this case, the displacement rate corresponding to the focus may be deceased in the same direction first, and then the displacement rate is increased in the opposite direction, thereby producing the damping effect and reducing uncertainty of operations and control.

Figure 5:
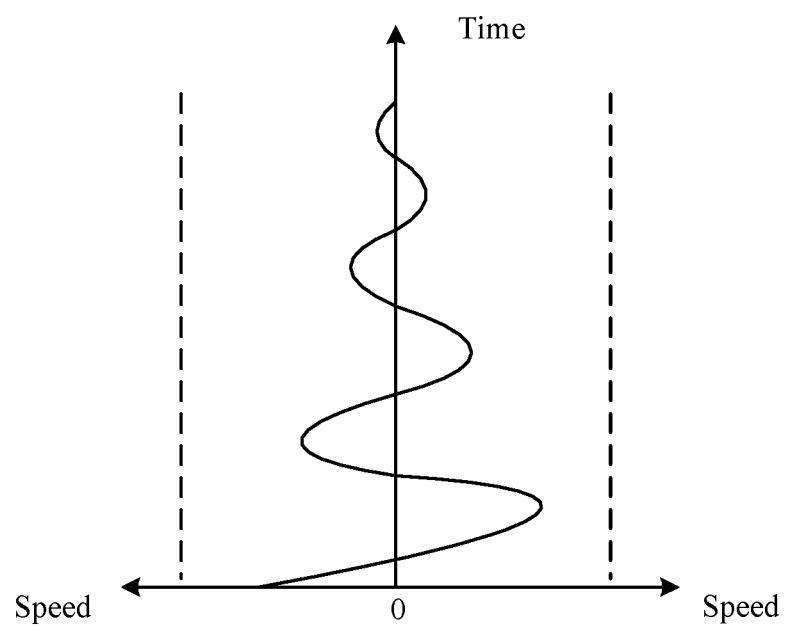
FIG. 5 is a schematic diagram of a damping effect according to an embodiment of the present disclosure.

FIG. 5 is a schematic diagram of a damping effect according to an embodiment of the present disclosure. The speed of a simulated object under the control of a control instruction is calculated by using the following formula:

$$\text{Speed} = \cos(\text{initial speed} \times \text{direction/target speed} \times \text{direction}) \times (\text{current time/total time}) \times \text{damping constant}$$

where the initial speed, the initial direction, the target speed and the target direction are movement data on a screen corresponding to movement of the face. The damping constant may be adjusted according to an actual scene. The damping constant is used for enhancing experience of acceleration and deceleration in mapping face turning to focus turning. For example, a value of the damping constant may be 0.53. In one embodiment of the present disclosure, a displacement rate corresponding to the focus may be reduced, to produce a damping effect and reduce uncertainty of operations and control, so that accuracy and smoothness of face control are greatly improved, making it possible for a game to perform interaction completely relying on facial expression recognition.

An interaction detection process performed based on the focus obtained by mapping the face in an interactive application scene is described above. FIG. 3 is a schematic block flowchart of another interaction method of an application scene according to an embodiment of the present disclosure. Next, an out-of-focus determining process is described in detail with reference to FIG. 3. In some embodiments of the present disclosure, the method provided in one embodiment of the present disclosure further includes the followings.

301. A mobile terminal determines pixel coordinates of a plurality of face key points on each frame of image acquired in real time.

The terminal may capture the pixel coordinates of the plurality of face key points on each frame of image by using a camera, and a quantity of the face key points may be set to 90.

302. The mobile terminal determines, according to the pixel coordinates of the plurality of face key points, whether a target face is out of focus.

The mobile terminal determines, according to the pixel coordinates of the face key points, whether the target face is out of focus. For example, analysis is made according to pixel coordinates of 90 face key points captured by the camera. In a case that the quantity of the captured key points cannot reach 90, or an amplitude of raising or lowering the head exceeds a specific amplitude (for example, 45 degrees), it is determined that the target face is out of focus. 303. The mobile terminal performs focusing and correction on the target face in a case that the target face is out of focus.

In one embodiment of the present disclosure, in a case that the face cannot be recognized or is out of determining by the camera, whether the user is out of focus is determined by calculating face data of the user in real time, to perform focusing and correction. Out-of-focus determining is performed in real time on the focus at which the face is mapped in step 301 to step 303, so that the focusing and correction may be performed in time, thereby completing the foregoing magnetic focusing and damping effect based on the focus in time.

Thus, according to the embodiments of the present disclosure, real-time image acquisition is performed on a target face by using a camera configured on the mobile terminal, to obtain a first frame of image and a second frame of image, the first frame of image and the second frame of image being two successive frames of images that are separately captured. The first frame of image is compared with the second frame of image, to obtain an action of the target face and a corresponding amplitude. A control instruction of a simulated object in an interactive application scene is generated according to the action of the target face and the corresponding amplitude, the simulated object and an interactive item being displayed in the interactive application scene. The simulated object is controlled, according to the control instruction, to interact with the interactive item in the interactive application scene. Further, the action and amplitude of the face may be obtained according to a comparison result of a plurality of frames of images captured by the camera in real time, so that the control instruction of the simulated object may be generated, and interaction between the simulated object and the interactive item is implemented by using the control instruction. Thus, scene interaction may be performed relying on a facial expression of a user instead of issuing an instruction with a finger of the user, so that immersive interaction on the mobile terminal may be implemented.

For better understanding and implementation of the foregoing solutions in the embodiments of the present disclosure, the following makes a specific description by using corresponding application scenes as an example.

In the embodiments of the present disclosure, face features of the user are captured frame by frame by using the camera while keeping compatibility with an existing input interaction method, an action made by the user and a corresponding amplitude are calculated by comparing face data of two successive frames, and different game inputs are generated correspondingly, thereby implementing a new interaction method without any finger operation. Accuracy and smoothness of face control are greatly improved, making it possible for a game to perform interaction completely relying on facial expression recognition.

A hardware requirement for the terminal according to the embodiments of the present disclosure is as follows: a mobile phone or a personal computer including a camera.

Figure 6:
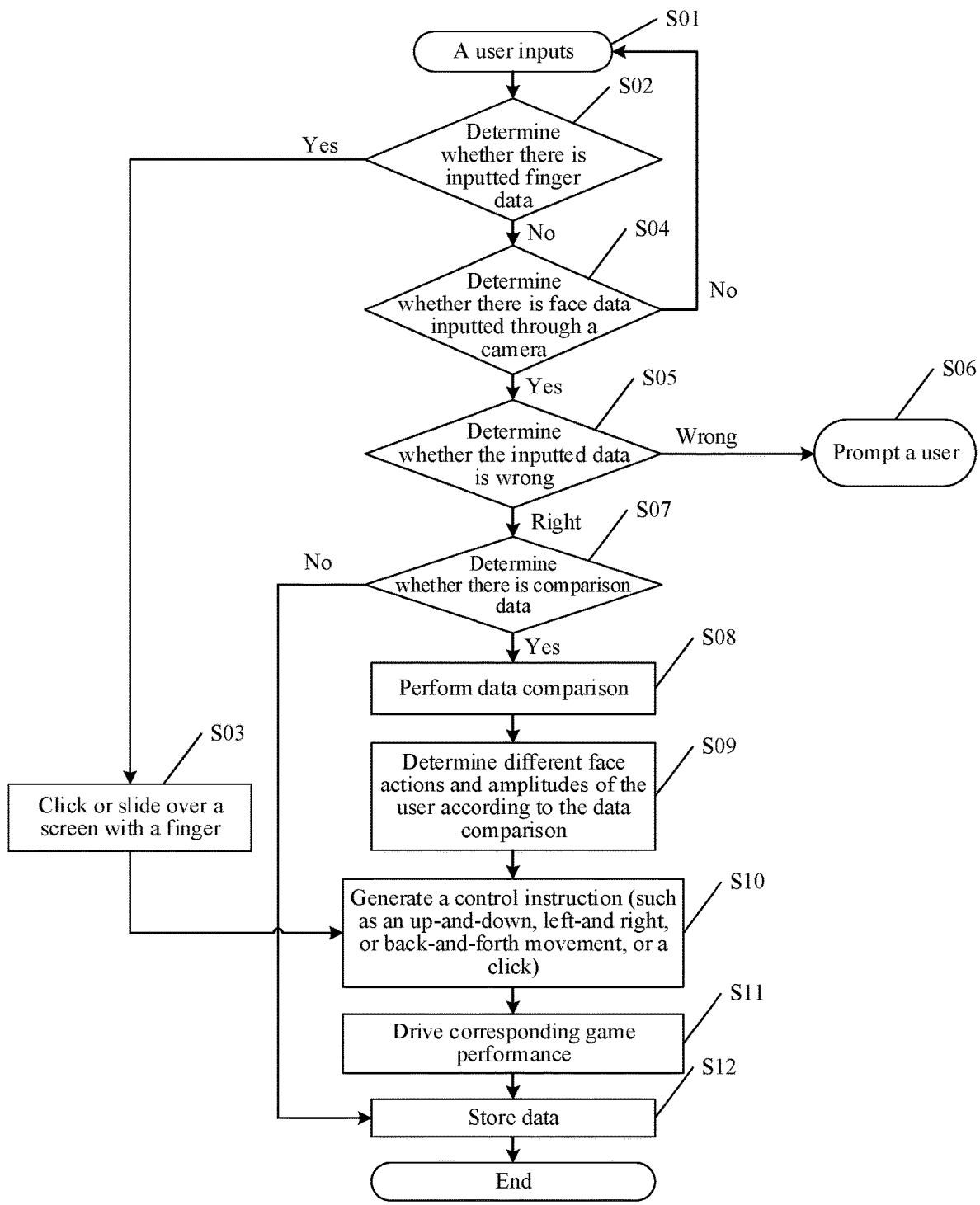
FIG. 6 is a schematic flowchart of interaction detection in a game scene according to an embodiment of the present disclosure.

FIG. 6 is a schematic flowchart of interaction detection in a game scene according to an embodiment of the present disclosure. An interaction detection process may include the followings.

S01. A user inputs a face image.

The user may acquire the face image by using a camera of a terminal, or may operate a touch screen with a finger.

S02. Determine whether there is inputted finger data.

The terminal may detect whether there is finger data inputted by the user on the touch screen.

S03. Click or slide over the screen with a finger.

In a case that the inputted finger data is detected, the user may click or slide over the screen.

S04. Determine whether there is face data inputted through the camera.

In a case that no finger data is detected, the terminal may determine whether there is face data inputted through the camera.

S05. Determine whether the inputted data is wrong.

After step S04, the terminal determines whether the inputted data is wrong, that is, whether a whole face image can be detected.

S06. Prompt the user.

In a case that the inputted data is wrong, the user is prompted to input again, or the user is prompted that the input of the face image fails.

S07. Determine whether there is comparison data.

In a case that a plurality of successive frames of face images are acquired by the terminal, comparison is made for the plurality of successive frames of images.

S08. Perform data comparison.

In the data comparison process, the terminal may compare two successive frames of face images. The specific comparison process is described in detail in the foregoing embodiments, and details are not described herein again.

In a case that no comparison is made on data inputted at the first time, a step of data storage is performed. In a case that comparison is performed for data inputted at the second time, the previous data is compared with current data.

S09. Determine different face actions and amplitudes of the user according to the data comparison.

After finishing the data comparison, the terminal may determine an action currently made by the user and a corresponding amplitude.

Specifically, an up-and-down movement of the face is used as an example. Current coordinates of an eyebrow center point on the face are compared with previous coordinate data of the eyebrow center point. An increase of a Y coordinate indicates raising the head; and a decrease of the Y coordinate indicates lowering the head. A left-and-right movement of the face is used as an example. Current coordinates of a nose tip on the face are compared with previous coordinate data of the nose tip. An increase of an X coordinate indicates turning left; and a decrease of the X coordinate indicates turning right. A back-and-forth movement of the face is used as an example. In a case that a distance between a far corner of the left eye and a far corner of the right eye on the face increases compared with previous data of the distance, it indicates that the face moves forth. In a case that the distance decreases compared with the data, it indicates that the face moves back. A click of the user is used as an example. Current coordinates of a center point on the face are compared with previous coordinate data of the center point. In a case that the coordinates are maintained in specific coordinate ranges for a specific time, it is determined that the face generates a click operation.

For example, Table 1 shows correspondences between basic functions and implementation mechanisms:

| Basic function | Operation | Performance | Implementation mechanism |
| --- | --- | --- | --- |
| Moving up | Moving the face up | Moving the background down | Relative displacement of a face recognition point |
| Moving down | Moving the face down | Moving the background up | Relative displacement of a face recognition point |
| Moving left | Moving the face left | Moving the background right | Relative displacement of a face recognition point |
| Moving right | Moving the face right | Moving the background left | Relative displacement of a face recognition point |
| Suspension | Sliding when the face moves | Mouse suspension-like operation | When a center position crosses the interactive object |
| Focusing | Frame alignment | Aligning the head or the upper body to a virtual frame, where the operation is completed when the head or the upper body is roughly inside the frame | A face recognition point is inside a focusing frame |

Table 2 shows correspondences between special functions and implementation mechanisms:

| Special function | Operation | Performance | Implementation mechanism |
| --- | --- | --- | --- |
| 0 | Locking | Operations such as scaling-up and rushing into (a passage) | Remaining still or in an area for 2.5 s |
| 1 | Biting | Mouth animation, fish eating, confirmation, and the like | Determining a displacement action of a recognition point of the mouth |
| 2 | Opening the mouth | Biting, and only opening the mouth without closing the mouth | Determining a displacement action of a recognition point of the mouth |
| 3 | Nodding | Nodding, pecking, or leaning twice, or the like | Moving the face down twice in a specific amplitude |
| 4 | Opening the mouth and nodding | Nodding twice after opening the mouth, call out settings, and the like | Combination of 2 + 3 functions |
| 5 | Lighting up | Lighting up (by using a flashlight) when the eyes are opened, and turning off a light source when the eyes are closed | Determining point positions of the eyes and whether the eyes are open |
| 6 | Closing the eyes/blinking | Blinking twice or closing the eyes for 2 s | Recognizing point positions of the eyes |
| ... | ... | ... | ... |

S10. Generate a control instruction (such as an up-and-down, left-and right, or back-and-forth movement, or a click).

In the foregoing Table 1 and Table 2, turning the face left and right corresponds to a left-and-right movement on the screen, and a turning amplitude corresponds to a moving distance on the screen. The raising the head and lowering the head correspond to the up-and-down movement of the screen, and the amplitude corresponds to the moving distance on the screen. Opening the mouth and closing the mouth correspond to related operations on the screen, for example, operations of biting and eating fish. A fixed point is maintained in a certain range for x seconds. The fixed point maintains the focus of a specific sight line stable in the range, and corresponds to an interactive item on the screen. The focus is locked, to complete the corresponding operation.

The following describes a manner of interaction between a simulated object and an interactive item.

Magnetic focusing: A distance between the simulated object at which the face is mapped into a device and the interactive item is calculated in real time, in an interactive item state, a displacement rate corresponding to the focus at which the face is mapped into the device is dynamically adjusted, and an attraction effect of an interaction point is generated, thereby reducing difficulty in performing an item interaction operation and improving accuracy.

Out-of-focus determining: By calculating and obtaining face data of the user in real time, whether the user is out of focus is determined, and out-of-focus correction is performed. For example, analysis is made according to coordinates of 90 face key points captured by the camera. In a case that the quantity of the captured key points cannot reach 90, or an amplitude of raising or lowering the head exceeds a specific amplitude (45 degrees), it is determined that a target face is out of focus.

Damping effect: In a case that a face operation is too fast and results in high-speed displacements in both directions, the damping effect is produced, and uncertainty of operations and control is reduced.

S11. Drive corresponding game operation.

The terminal may drive the corresponding game operation based on the control instruction generated in the foregoing steps. Various game scenes are described below by using examples.

A game in which accurate control operations are performed based on face recognition is used as an example. In a game scene, the user plays the whole game by using face control operations, and by using a camera of a mobile phone, controls a character in the game to complete different operations, such as moving, locking, biting, and pecking, according to playing methods of different levels. Different from touch operations of conventional games, in one embodiment of the present disclosure, a contactless control form is adopted in the whole process, and a first person view is used for enhancing a sense of immersion and bringing unique game experience.

Main features of such approach may include: (1) No contact in the whole process: The whole game process has no touch operation, and all game behaviors are completed by using face recognition. (2) Accurate control and interaction: Face control that is originally fuzzy and imprecise becomes practical and more accurate by using technical solutions of the product such as magnetic focusing, out-of-focus correction, and a damping effect. Therefore, difficulty of the face control is reduced, and control may be performed more accurately. (3) Sense of immersion: The first person view is used for fully fitting a face control playing method, thereby bringing realistic game experience and enhancing impact of the game.

Figure 7:
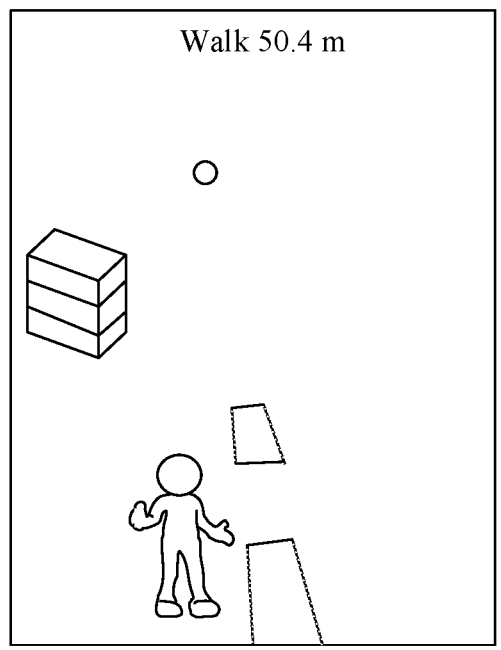
FIG. 7 is a schematic diagram of interaction detection in a game scene according to an embodiment of the present disclosure.

FIG. 7 is a schematic diagram of interaction detection in a game scene according to an embodiment of the present disclosure. As shown in FIG. 7, in a version sample of the game scene, a game scene of a playing method level is used as an example. A simulated object controlled by a player is a character of a drunken man, and an interactive item in the game scene of the playing method level is an obstacle. A camera of a mobile terminal captures the face of the player in real time, and obtains an action of the player and a corresponding amplitude by comparing two successive frames of images that are captured. A control instruction of the drunken man may be generated according to the action and amplitude of the player. For example, the drunken man is controlled to move left. After the drunken man moves left, the drunken man collides with an obstacle. In another example, the drunken man is controlled to move right. After the drunken man moves right, the drunken man successfully avoids the obstacle. By using the example of the scene shown in FIG. 7, in one embodiment of the present disclosure, the obstacle may be avoided by controlling the movement of the drunken man through the face, so that interaction between the drunken man and the obstacle may be implemented.

Figure 8:
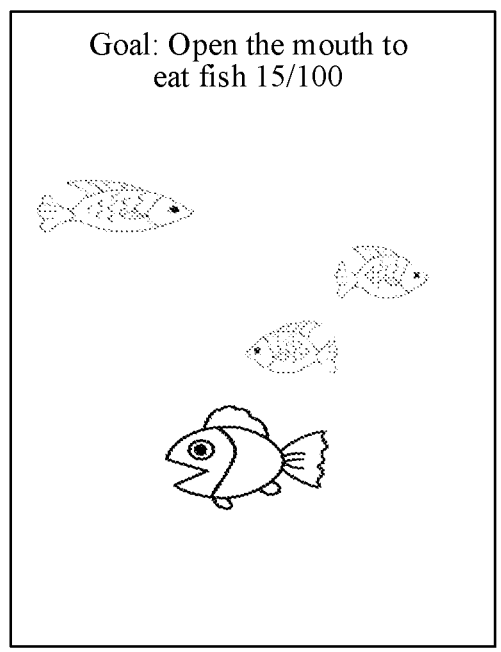
FIG. 8 is a schematic diagram of interaction detection in another game scene according to an embodiment of the present disclosure.

FIG. 8 is a schematic diagram of interaction detection in another game scene according to an embodiment of the present disclosure. As shown in FIG. 8, in another version sample of the game scene, a game scene of an undersea playing method level is used as an example. A simulated object controlled by a player is a character of a fish, and an interactive item in the game scene of the undersea playing method level is a mouth. A camera of a mobile terminal captures the face of the player in real time, and obtains an action of the player and a corresponding amplitude by comparing two successive frames of images that are captured. A control instruction of the fish may be generated according to the action and amplitude of the player. For example, the fish is controlled to move left. After the fish moves left, the mouth eats a fish. In another example, the fish is controlled to move right. After the fish moves right, the fish successfully avoids being caught by the mouth. By using the example of the scene shown in FIG. 8, in one embodiment of the present disclosure, hunting (eating fish) may be performed by controlling, through the face, the fish to swim and the mouth to bite, so that interaction between the fish and the mouth may be implemented.

Figure 9:
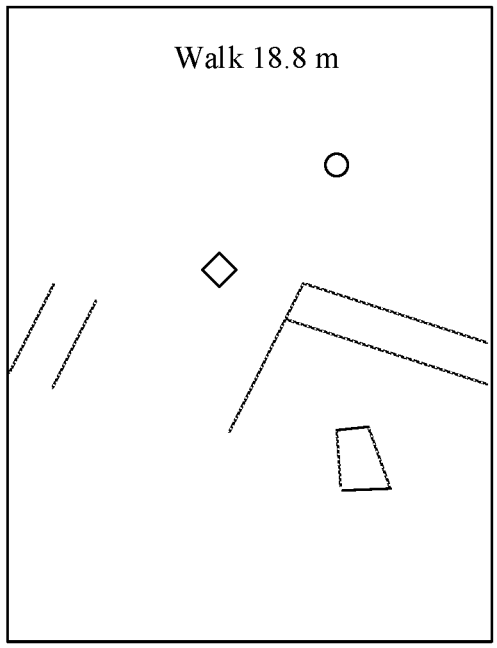
FIG. 9 is a schematic diagram of interaction detection in another game scene according to an embodiment of the present disclosure.

FIG. 9 is a schematic diagram of interaction detection in another game scene according to an embodiment of the present disclosure. As shown in FIG. 9, in another version sample of a game scene, in a case that out-of-camera occurs in face recognition, interaction with a User Interface (UI) is performed in the game in a form of out-of-focus correction. That is, a user adjusts a position of the face according to a UI contour prompt appeared on a screen, to achieve refocusing. For a detailed process of the out-of-focus correction, refer to the foregoing examples.

Returning to FIG. 6, the interaction detection process further include: S12. Store data.

After each time a frame of face image is obtained, the data is stored, so that a previous frame of face image may be invoked when comparison is performed on data of a next frame.

According to the technical solutions provided in the embodiments of the present disclosure, a game in which interaction is performed completely relying on facial expression recognition is implemented, thereby greatly improving a sense of immersion of a game providing immersive experience on a mobile terminal. In addition, an interaction method not relying on contact with a screen, accessibility when playing the game in some special scenarios is improved. Besides, games targeted at special people having hand deficiencies may also be developed by using the technical solutions, to complete interaction in a case that it is inconvenient for a user to use fingers or the mobile terminal is not equipped with a touch screen.

The foregoing method embodiments are expressed as a series of action combinations for the purpose of brief description, but it is to be learned by a person skilled in the art that because some steps may be performed in other sequences or simultaneously according to the embodiments of the present disclosure, the embodiments of the present disclosure are not limited to a described action sequence.

An embodiment of the present disclosure further provides a computer-readable storage medium. Optionally, in one embodiment, the foregoing computer-readable storage medium includes instructions, the instructions, when run on a computer, causing the computer to perform the foregoing method.

Optionally, in one embodiment, when the instructions included in the computer-readable storage medium are run on a computer, the instructions causes the computer to perform the followings:

11. A mobile terminal performs real-time image acquisition on a target face by using a camera configured on the mobile terminal, to obtain a first frame of image and a second frame of image, the first frame of image and the second frame of image being two successive frames of images that are separately captured.

12. The mobile terminal compares the first frame of image with the second frame of image, to obtain an action of the target face and a corresponding amplitude.

13. The mobile terminal generates a control instruction of a simulated object in an interactive application scene according to the action of the target face and the corresponding amplitude, the simulated object and an interactive item being displayed in the interactive application scene.

14. The mobile terminal controls, according to the control instruction, the simulated object to interact with the interactive item in the interactive application scene.

Optionally, for a specific example in one embodiment, reference may be made to the examples described in the foregoing embodiments, and details are not described in one embodiment again.

For the convenience of a better implementation of the foregoing solutions of the embodiments of the present disclosure, the following further provides related apparatuses configured to implement the foregoing solutions.

Figure 10A:
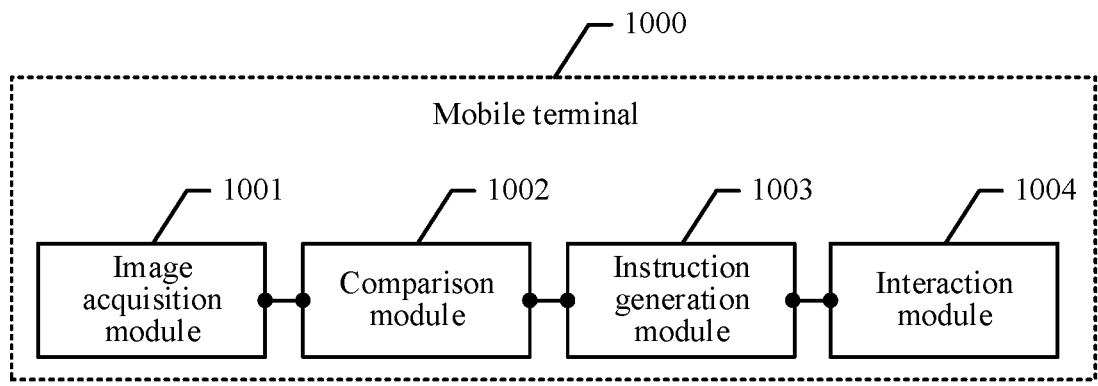
FIG. 10A is a schematic structural diagram of a mobile terminal according to an embodiment of the present disclosure.

FIG. 10A is a schematic structural diagram of a mobile terminal according to an embodiment of the present disclosure. As shown in FIG. 10A, one embodiment of the present disclosure provides a mobile terminal 1000, which may include one or more processors and one or more memories storing program units, the program units being executed by the processor, and the program units including: an image acquisition module 1001, a comparison module 1002, an instruction generation module 1003, and an interaction module 1004.

The image acquisition module 1001 is configured to perform real-time image acquisition on a target face by using a camera configured on the mobile terminal, to obtain a first frame of image and a second frame of image, the first frame of image and the second frame of image being two successive frames of images that are separately captured.

The comparison module 1002 is configured to compare the first frame of image with the second frame of image, to obtain an action of the target face and a corresponding amplitude.

The instruction generation module 1003 is configured to generate a control instruction of a simulated object in an interactive application scene according to the action of the target face and the corresponding amplitude, the simulated object and an interactive item being displayed in the interactive application scene.

The interaction module 1004 is configured to control, according to the control instruction, the simulated object to interact with the interactive item in the interactive application scene.

Figure 10B:
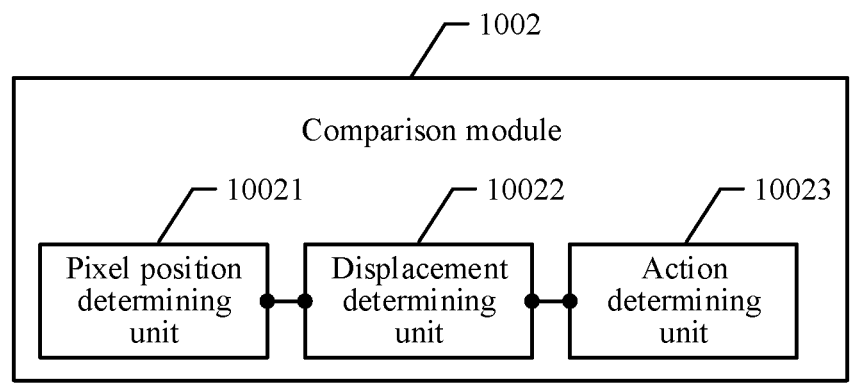
FIG. 10B is a schematic structural diagram of a comparison module according to an embodiment of the present disclosure.

FIG. 10B is a schematic structural diagram of a comparison module according to an embodiment of the present disclosure. In some embodiments of the present disclosure, as shown in FIG. 10B, the comparison module 1002 includes: a pixel position determining unit 10021, a displacement determining unit 10022, and an action determining unit 10023.

The pixel position determining unit 10021 is configured to determine a first pixel position at which a face positioning point appears in the first frame of image, and a second pixel position at which the face positioning point appears in the second frame of image.

The displacement determining unit 10022 is configured to compare the first pixel position with the second pixel position, to obtain a relative displacement between the first pixel position and the second pixel position.

The action determining unit 10023 is configured to determine the action of the target face and the corresponding amplitude according to the relative displacement between the first pixel position and the second pixel position.

Figure 10C:
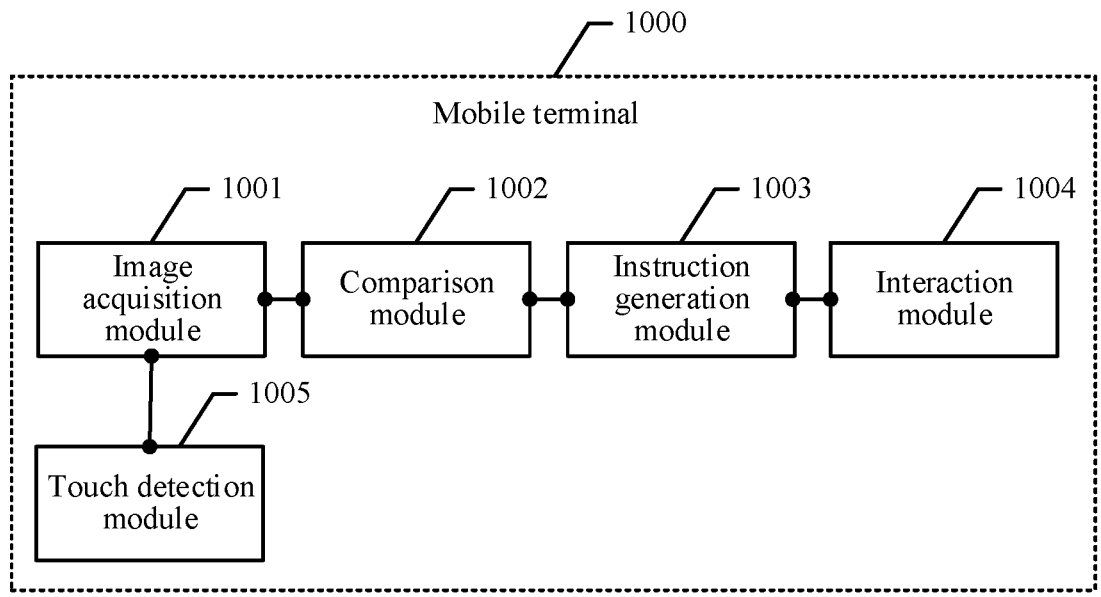
FIG. 10C is a schematic structural diagram of another mobile terminal according to an embodiment of the present disclosure.

FIG. 10C is a schematic structural diagram of another mobile terminal according to an embodiment of the present disclosure. In some embodiments of the present disclosure, as shown in FIG. 10C, compared with FIG. 10A, the program units further include a touch detection module 1005. The touch detection module 1005 is configured to detect, before the image acquisition module 1001 performs the real-time image acquisition on the target face by using the camera configured on the mobile terminal, whether a touch input is generated on a touch screen of the mobile terminal; and trigger the image acquisition module in a case that no touch input is generated on the touch screen.

Figure 10D:
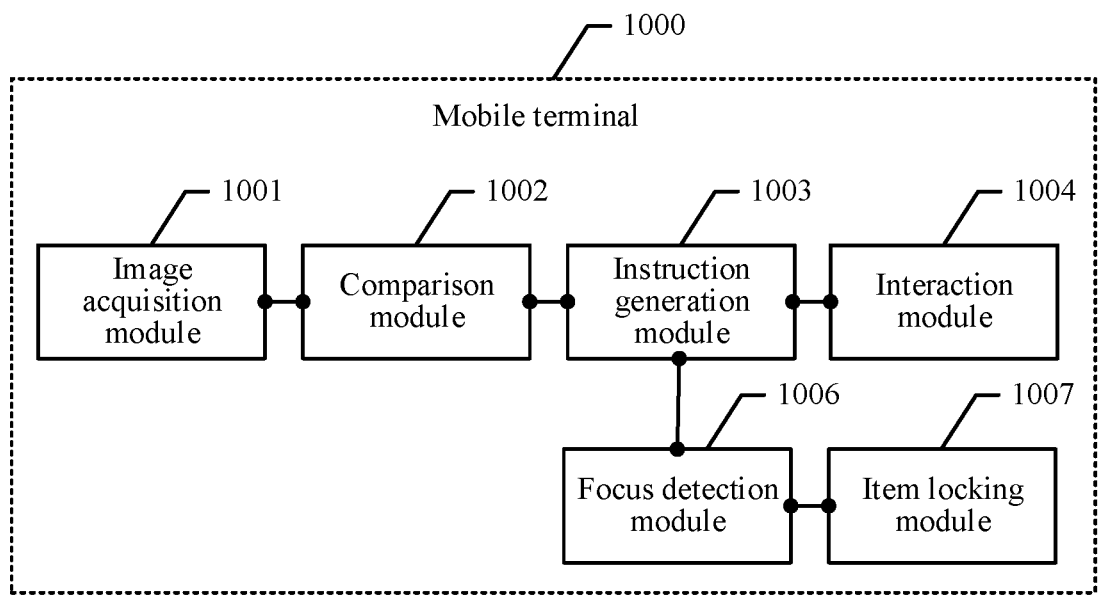
FIG. 10D is a schematic structural diagram of another mobile terminal according to an embodiment of the present disclosure.

FIG. 10D is a schematic structural diagram of another mobile terminal according to an embodiment of the present disclosure. In some embodiments of the present disclosure, as shown in FIG. 10D, compared with FIG. 10A, the program units further include: a focus detection module 1006 and an item locking module 1007.

The focus detection module 1006 is configured to determine, after the instruction generation module 1003 generates the control instruction of the simulated object in the interactive application scene according to the action of the target face and the corresponding amplitude, according to the control instruction, whether a focus remains stable in an interactive item range for a preset time length, the focus being a reference point at which the target face is mapped into the interactive application scene. The item locking module 1007 is configured to lock the interactive item in the interactive item range in a case that the focus remains stable in the interactive item range for the preset time length.

Figure 10E:
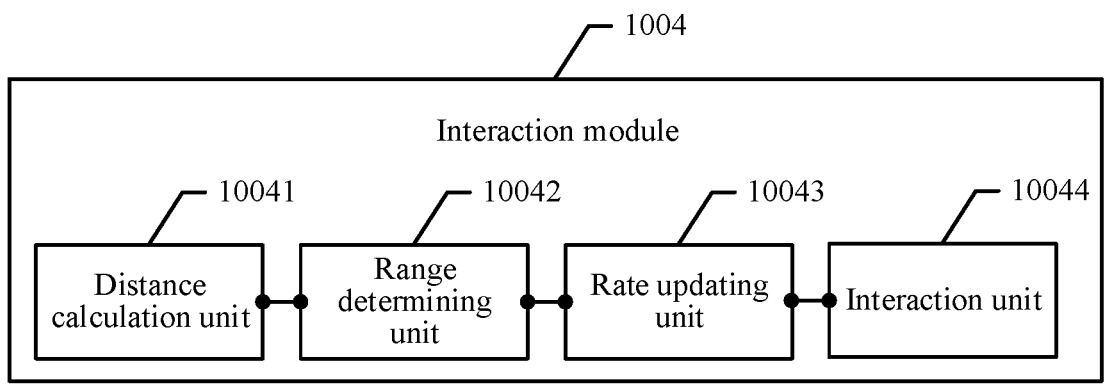
FIG. 10E is a schematic structural diagram of an interaction module according to an embodiment of the present disclosure.

FIG. 10E is a schematic structural diagram of an interaction module according to an embodiment of the present disclosure. In some embodiments of the present disclosure, as shown in FIG. 10E, the interaction module 1004 includes: a distance calculation unit 10041, a range determining unit 10042, a rate updating unit 10043, and an interaction unit 10044.

The distance calculation unit 10041 is configured to calculate a distance between a focus and the interactive item in real time, the focus being a reference point at which the target face is mapped into the interactive application scene.

The range determining unit 10042 is configured to determine, according to the distance calculated in real time, whether the focus is in an interactive item range.

The rate updating unit 10043 is configured to update, according to the distance calculated in real time, a displacement rate corresponding to the focus in a case that the focus is in the interactive item range.

The interaction unit 10044 is configured to update the control instruction according to the updated displacement rate, and control, by using the updated control instruction, the simulated object to interact with the interactive item.

In some embodiments of the present disclosure, the rate updating unit 10043 is specifically configured to reduce the displacement rate first and then increase the displacement rate in a moving direction of the focus in a case that the distance between the focus and the interactive item decreases; or reduce the displacement rate in a moving direction of the focus first and then increase the displacement rate in a direction opposite to the moving direction in a case that the distance between the focus and the interactive item increases.

Figure 10F:
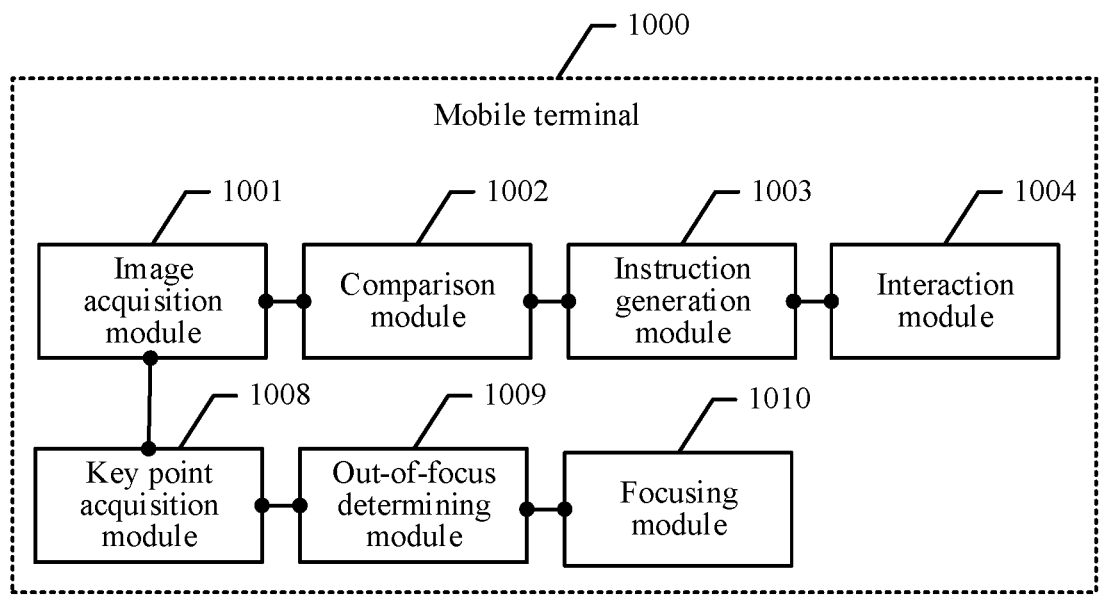
FIG. 10F is a schematic structural diagram of another mobile terminal according to an embodiment of the present disclosure.

FIG. 10F is a schematic structural diagram of another mobile terminal according to an embodiment of the present disclosure. In some embodiments of the present disclosure, as shown in FIG. 10F, compared with FIG. 10A, the program units further include: a key point acquisition module 1008, an out-of-focus determining module 1009, and a focusing module 1010.

The key point acquisition module 1008 is configured to determine pixel coordinates of a plurality of face key points on each frame of image acquired in real time. The out-of-focus determining module 1009 is configured to determine, according to the pixel coordinates of the plurality of face key points, whether the target face is out of focus. The focusing module 1010 is configured to perform focusing and correction on the target face in a case that the target face is out of focus.

It may be learned from the above descriptions of the embodiments of the present disclosure that, real-time image acquisition is performed on a target face by using a camera configured on the mobile terminal, to obtain a first frame of image and a second frame of image, the first frame of image and the second frame of image being two successive frames of images that are separately captured; the first frame of image is compared with the second frame of image, to obtain an action of the target face and a corresponding amplitude; a control instruction of a simulated object in an interactive application scene is generated according to the action of the target face and the corresponding amplitude, the simulated object and an interactive item being displayed in the interactive application scene; and the simulated object is controlled, according to the control instruction, to interact with the interactive item in the interactive application scene. In the embodiments of the present disclosure, the action and amplitude of the face may be obtained according to a comparison result of a plurality of frames of images captured by the camera in real time, so that the control instruction of the simulated object may be generated, and interaction between the simulated object and the interactive item is implemented by using the control instruction. In the embodiments of the present disclosure, scene interaction may be performed relying on a facial expression of a user instead of issuing an instruction with a finger of the user, so that immersive interaction on the mobile terminal may be implemented.

Figure 11:
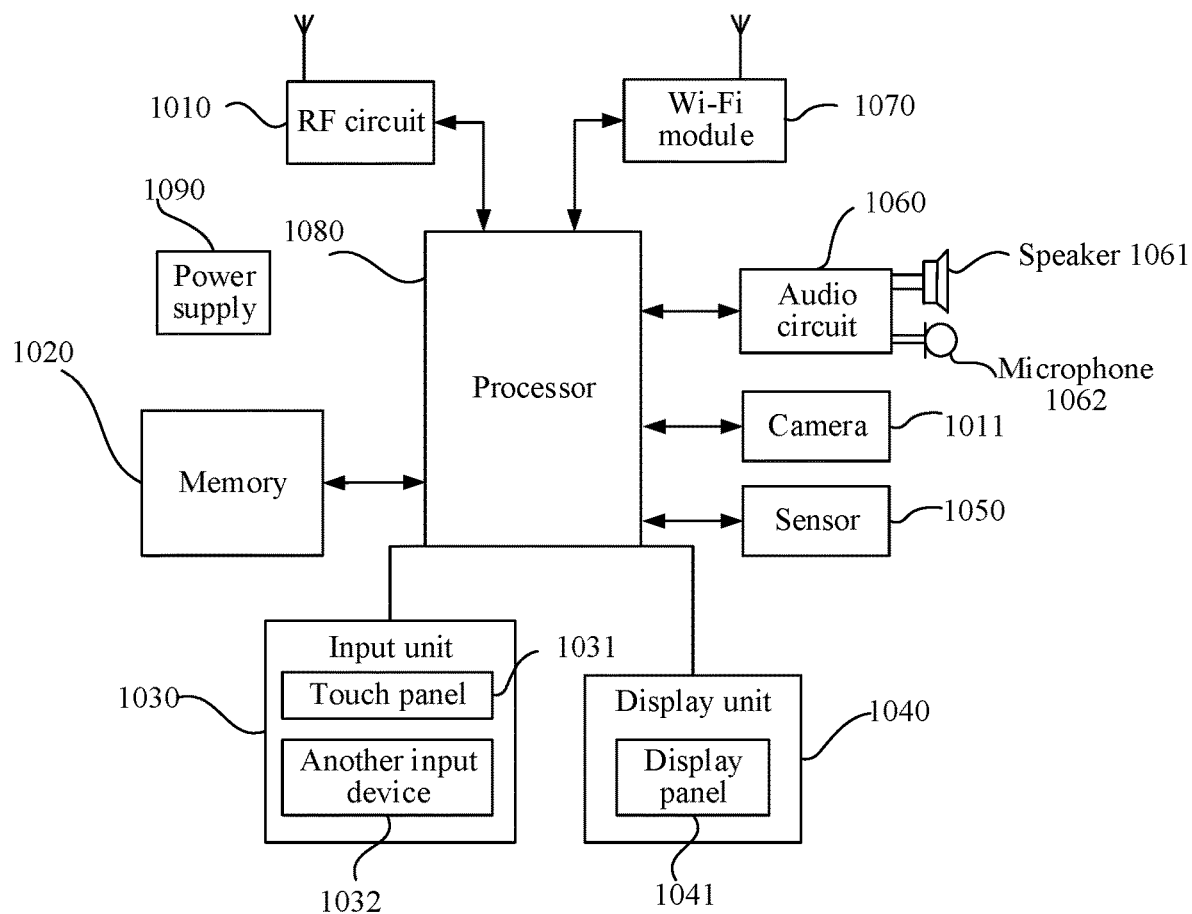
FIG. 11 is a schematic structural diagram of applying an interaction method of an application scene to a terminal according to an embodiment of the present disclosure.

An embodiment of the present disclosure further provides another terminal. FIG. 11 is a schematic structural diagram of applying an interaction method of an application scene to a terminal according to an embodiment of the present disclosure. As shown in FIG. 11, for ease of description, only parts related to the embodiments of the present disclosure are shown. For specific technical details that are not disclosed, refer to the method part in the embodiments of the present disclosure. The terminal device may be any terminal device including a mobile phone, a tablet computer, a personal digital assistant (PDA), a point of sales (POS), and an on-board computer, and the terminal device being a mobile phone is used as an example:

FIG. 11 is a block diagram of a partial structure of a mobile phone related to a terminal according to an embodiment of the present disclosure. Referring to FIG. 11, the mobile phone includes components such as a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply 1090. A person skilled in the art may understand that the mobile phone structure shown in FIG. 11 constitutes no limitation on the mobile phone, and the mobile phone may include more or fewer components than those shown in the figure, or some components are combined, or a different component deployment is used.

The components of the mobile phone are described in detail below with reference to FIG. 11. The RF circuit 1010 may be configured to receive and send signals during an information receiving and sending process or a call process. Specifically, the RF circuit 1010 receives downlink information from a base station, then delivers the downlink information to the processor 1080 for processing, and sends designed uplink data to the base station. Usually, the RF circuit 1010 includes, but is not limited to, an antenna, at least one amplifier, a transceiver, a coupler, a low noise amplifier (LNA), and a duplexer. In addition, the RF circuit 1010 may further communicate with a network and another device through wireless communication. The wireless communication may use any communications standard or protocol, including, but being not limited to a global system of mobile communication (GSM), a general packet radio service (GPRS), code division multiple access (CDMA), wideband code division multiple access (WCDMA), Long Term Evolution (LTE), an email, a short messaging service (SMS), and the like.

The memory 1020 may be configured to store a software program and module. The processor 1080 runs the software program and module stored in the memory 1020, to implement various functional applications of the mobile phone and data processing. The memory 1020 may mainly include a program storage area and a data storage area. The program storage area may store an operating system, an application program required for at least one function (such as an audio playing function and an image playing function), and the like. The data storage area may store data (such as audio data and a phone book) created according to use of the mobile phone. In addition, the memory 1020 may include a high speed random access memory, and may further include a non-volatile memory, such as at least one magnetic disk memory device, a flash memory device, or other non-volatile solid state memory devices.

The input unit 1030 may be configured to receive input digit or character information, and generate a key signal input related to the user setting and function control of the mobile phone. Specifically, the input unit 1030 may include a touch panel 1031 and other input devices 1032. The touch panel 1031, also referred to as a touchscreen, may collect a touch operation performed by the user on or near the touch panel (such as an operation performed by a user on the touch panel 1031 or near the touch panel 1031 by using any proper object or accessory, such as a finger or a stylus), and drive a corresponding connecting apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1080. Moreover, the touch controller can receive and execute a command sent from the processor 1080. In addition, the touch panel 1031 may be a touch panel of a resistive, capacitive, infrared, or surface acoustic wave type. In addition to the touch panel 1031, the input unit 1030 may further include another input device 1032. Specifically, the other input devices 1032 may include but are not limited to one or more of a physical keyboard, a function key (such as a volume control key or a power on/off key), a trackball, a mouse, a joystick, and the like.

The display unit 1040 may be configured to display information entered by the user or information provided for the user, and various menus of the mobile phone. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, so as to determine the type of the touch event. Then, the processor 1080 provides a corresponding visual output on the display panel 1041 according to the type of the touch event. Although in FIG. 11, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear. As one type of motion sensor, an acceleration sensor may detect magnitude of accelerations in various directions (generally on three axes), may detect magnitude and a direction of the gravity when static, and may be configured to be an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 1060, a speaker 1061, and a microphone 1062 may provide audio interfaces between a user and the mobile phone. The audio circuit 1060 may convert received audio data into an electrical signal and transmit the electrical signal to the speaker 1061. The speaker 1061 converts the electrical signal into a sound signal for output. On the other hand, the microphone 1062 converts a collected sound signal into an electrical signal. The audio circuit 1060 receives the electrical signal, converts the electrical signal into audio data, and outputs the audio data to the processor 1080 for processing. Then, the processor 1080 sends the audio data to, for example, another mobile phone by using the RF circuit 1010, or outputs the audio data to the memory 1020 for further processing.

Wi-Fi belongs to a short distance wireless transmission technology. The mobile phone may help, by using the Wi-Fi module 1070, a user to receive and send an email, browse a web page, access stream media, and the like. This provides wireless broadband Internet access for the user. Although FIG. 11 shows the Wi-Fi module 1070, it may be understood that the Wi-Fi module 1070 is not a necessary component of the mobile phone, and the Wi-Fi module 1070 may be omitted as required provided that the scope of the essence of the present disclosure is not changed.

The processor 1080 is a control center of the mobile phone, and is connected to various parts of the entire mobile phone by using various interfaces and lines. By running or executing a software program and/or module stored in the memory 1020, and invoking data stored in the memory 1020, the processor 1080 executes various functions of the mobile phone and performs data processing, thereby monitoring the entire mobile phone. Optionally, the processor 1080 may include one or more processing units. Preferably, the processor 1080 may integrate an application processor and a modem processor. The application processor mainly processes an operating system, a user interface, an application program, and the like. The modem processor mainly processes wireless communication. It may be understood that the foregoing modem may alternatively not be integrated into the processor 1080.

The mobile phone further includes the power supply 1090 (such as a battery) for supplying power to the components. Preferably, the power supply may be logically connected to the processor 1080 by using a power management system, thereby implementing functions such as charging, discharging, and power consumption management by using the power management system.

The mobile phone may further include a camera 1011, and the camera 1011 may be a front-facing camera of the phone. After the camera 1011 acquires a plurality of frames of face images, the processor 1080 processes the plurality of frames of face images. In an embodiment of the present disclosure, the processor 1080 included in the terminal further has a procedure that controls and performs the interaction method of an application scene performed by the terminal.

In addition, the apparatus embodiment described above is merely schematic. Units described as separate parts may or may not be physically separate, and parts displayed as units may or may not be physical units, may be located in one position, or may be distributed on a plurality of network units. Some or all of the modules may be selected based on an actual requirement, to achieve an objective of the solution in one embodiment. In addition, in the accompanying drawings of the apparatus embodiments provided by the embodiments of the present disclosure, connection relationships between modules indicate that the modules have communication connections with each other, which may be specifically implemented as one or more communications buses or signal cables. A person of ordinary skill in the art may understand and implement one embodiment without creative efforts.

Based on the description of the foregoing implementations, a person skilled in the art may understand that the embodiments of the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit.

INDUSTRIAL APPLICABILITY

In the embodiments of the present disclosure, real-time image acquisition is performed on a target face by using a camera configured on the mobile terminal, to obtain a first frame of image and a second frame of image, the first frame of image and the second frame of image being two successive frames of images that are separately captured; the first frame of image is compared with the second frame of image, to obtain an action of the target face and a corresponding amplitude; a control instruction of a simulated object in an interactive application scene is generated according to the action of the target face and the corresponding amplitude, the simulated object and an interactive item being displayed in the interactive application scene; and the simulated object is controlled according to the control instruction to interact with the interactive item in the interactive application scene. In the embodiments of the present disclosure, the action and amplitude of the face may be obtained according to a comparison result of a plurality of frames of images captured by the camera in real time, so that the control instruction of the simulated object may be generated, and interaction between the simulated object and the interactive item is implemented by using the control instruction. In the embodiments of the present disclosure, scene interaction may be performed relying on a facial expression of a user instead of issuing an instruction with a finger of the user, so that immersive interaction on the mobile terminal may be implemented.

What is claimed is:

1. An interaction method for a mobile terminal, comprising:
performing real-time image acquisition on a target face by using a camera configured on the mobile terminal, to obtain a first frame of image and a second frame of image, the first frame of image and the second frame of image being two successive frames of images that are separately captured;
comparing the first frame of image with the second frame of image, to obtain an action of the target face and a corresponding amplitude;
generating a control instruction of a simulated object in an interactive application scene according to the action of the target face and the corresponding amplitude, the simulated object and an interactive item being displayed in the interactive application scene;
determining, according to the control instruction, whether a focus remains stable in an interactive item range for a preset time length, the focus being a reference point at which the target face is mapped into the interactive application scene;
locking the interactive item in the interactive item range when the focus remains stable in the interactive item range for the preset time length; and
controlling, according to the control instruction, the simulated object to interact with the interactive item in the interactive application scene.

2. The method according to claim 1, wherein the comparing the first frame of image with the second frame of image, to obtain an action of the target face and a corresponding amplitude comprises:
determining a first pixel position at which a face positioning point appears in the first frame of image, and a second pixel position at which the face positioning point appears in the second frame of image;
comparing the first pixel position with the second pixel position, to obtain a relative displacement between the first pixel position and the second pixel position; and
determining the action of the target face and the corresponding amplitude according to the relative displacement between the first pixel position and the second pixel position.

3. The method according to claim 1, wherein before the performing real-time image acquisition on a target face by using a camera configured on the mobile terminal, the method further comprises:
detecting whether a touch input is generated on a touch screen of the mobile terminal; and
triggering, when no touch input is generated on the touch screen, performing the real-time image acquisition on the target face by using the camera configured on the mobile terminal.

4. The method according to claim 1, wherein the controlling, according to the control instruction, the simulated object to interact with the interactive item in the interactive application scene comprises:
calculating a distance between a focus and the interactive item in real time, the focus being a reference point at which the target face is mapped into the interactive application scene;
determining, according to the distance calculated in real time, whether the focus is in an interactive item range;
updating, according to the distance calculated in real time, a displacement rate corresponding to the focus when the focus is in the interactive item range; and
updating the control instruction according to the updated displacement rate, and controlling, by using the updated control instruction, the simulated object to interact with the interactive item.

5. The method according to claim 4, wherein the updating, according to the distance calculated in real time, a displacement rate corresponding to the focus comprises:
reducing the displacement rate first and then increasing the displacement rate in a moving direction of the focus when the distance between the focus and the interactive item decreases; or
reducing the displacement rate in a moving direction of the focus first and then increasing the displacement rate in a direction opposite to the moving direction when the distance between the focus and the interactive item increases.

6. The method according to claim 1, wherein the method further comprises:
determining pixel coordinates of a plurality of face key points on each frame of image acquired in real time;
determining, according to the pixel coordinates of the plurality of face key points, whether the target face is out of focus; and
performing focusing and correction on the target face when the target face is out of focus.

7. The method according to claim 1, further comprising:
when the interactive application scene includes a plurality of interactive items, selecting the interactive item to be interacted with the simulated object according to distances between the focus and interactive item ranges of the plurality of interactive items.

8. The method according to claim 1, wherein the action of the target face including an action of a facial organ on the target face.

9. The method according to claim 8, wherein comparing the first frame of image with the second frame of image comprises:
comparing coordinates of a center point of the facial organ in the first frame of image and the second frame of image, to obtain the action of the target face.

10. A mobile terminal, comprising:
a memory storing computer program instructions; and
a processor coupled to the memory and, when executing the computer program instructions, configured to perform:
performing real-time image acquisition on a target face by using a camera configured on the mobile terminal, to obtain a first frame of image and a second frame of image, the first frame of image and the second frame of image being two successive frames of images that are separately captured;
comparing the first frame of image with the second frame of image, to obtain an action of the target face and a corresponding amplitude;
generating a control instruction of a simulated object in an interactive application scene according to the action of the target face and the corresponding amplitude, the simulated object and an interactive item being displayed in the interactive application scene;
determining, according to the control instruction, whether a focus remains stable in an interactive item range for a preset time length, the focus being a reference point at which the target face is mapped into the interactive application scene;

locking the interactive item in the interactive item range when the focus remains stable in the interactive item range for the preset time length; and controlling, according to the control instruction, the simulated object to interact with the interactive item in the interactive application scene.

11. The mobile terminal according to claim 10, wherein the comparing the first frame of image with the second frame of image, to obtain an action of the target face and a corresponding amplitude comprises:

determining a first pixel position at which a face positioning point appears in the first frame of image, and a second pixel position at which the face positioning point appears in the second frame of image;

comparing the first pixel position with the second pixel position, to obtain a relative displacement between the first pixel position and the second pixel position; and determining the action of the target face and the corresponding amplitude according to the relative displacement between the first pixel position and the second pixel position.

12. The mobile terminal according to claim 10, wherein, before the performing real-time image acquisition on a target face by using a camera configured on the mobile terminal, the processor further performs:

detecting whether a touch input is generated on a touch screen of the mobile terminal; and triggering, when no touch input is generated on the touch screen, performing the real-time image acquisition on the target face by using the camera configured on the mobile terminal.

13. The mobile terminal according to claim 10, wherein the controlling, according to the control instruction, the simulated object to interact with the interactive item in the interactive application scene comprises:

calculating a distance between a focus and the interactive item in real time, the focus being a reference point at which the target face is mapped into the interactive application scene;

determining, according to the distance calculated in real time, whether the focus is in an interactive item range;

updating, according to the distance calculated in real time, a displacement rate corresponding to the focus when the focus is in the interactive item range; and updating the control instruction according to the updated displacement rate, and controlling, by using the updated control instruction, the simulated object to interact with the interactive item.

14. The mobile terminal according to claim 13, wherein the updating, according to the distance calculated in real time, a displacement rate corresponding to the focus comprises:

reducing the displacement rate first and then increasing the displacement rate in a moving direction of the focus when the distance between the focus and the interactive item decreases; or reducing the displacement rate in a moving direction of the focus first and then increasing the displacement rate in a direction opposite to the moving direction when the distance between the focus and the interactive item increases.

15. The mobile terminal according to claim 10, wherein the processor further performs:

determining pixel coordinates of a plurality of face key points on each frame of image acquired in real time;

determining, according to the pixel coordinates of the plurality of face key points, whether the target face is out of focus; and performing focusing and correction on the target face when the target face is out of focus.

16. A non-transitory computer-readable storage medium storing computer program instructions executable by at least one processor to perform:

performing real-time image acquisition on a target face by using a camera configured on a mobile terminal, to obtain a first frame of image and a second frame of image, the first frame of image and the second frame of image being two successive frames of images that are separately captured;

comparing the first frame of image with the second frame of image, to obtain an action of the target face and a corresponding amplitude;

generating a control instruction of a simulated object in an interactive application scene according to the action of the target face and the corresponding amplitude, the simulated object and an interactive item being displayed in the interactive application scene;

determining, according to the control instruction, whether a focus remains stable in an interactive item range for a preset time length, the focus being a reference point at which the target face is mapped into the interactive application scene;

locking the interactive item in the interactive item range when the focus remains stable in the interactive item range for the preset time length; and controlling, according to the control instruction, the simulated object to interact with the interactive item in the interactive application scene.

17. The non-transitory computer-readable storage medium according to claim 16, wherein the comparing the first frame of image with the second frame of image, to obtain an action of the target face and a corresponding amplitude comprises:

determining a first pixel position at which a face positioning point appears in the first frame of image, and a second pixel position at which the face positioning point appears in the second frame of image;

comparing the first pixel position with the second pixel position, to obtain a relative displacement between the first pixel position and the second pixel position; and determining the action of the target face and the corresponding amplitude according to the relative displacement between the first pixel position and the second pixel position.

18. The non-transitory computer-readable storage medium according to claim 16, wherein before the performing real-time image acquisition on a target face by using a camera configured on the mobile terminal, the computer program instructions are executable by the at least one processor to further perform:

detecting whether a touch input is generated on a touch screen of the mobile terminal; and triggering, when no touch input is generated on the touch screen, performing the real-time image acquisition on the target face by using the camera configured on the mobile terminal.

19. The non-transitory computer-readable storage medium according to claim 16, wherein the controlling, according to the control instruction, the simulated object to interact with the interactive item in the interactive application scene comprises:

calculating a distance between a focus and the interactive item in real time, the focus being a reference point at which the target face is mapped into the interactive application scene;

determining, according to the distance calculated in real time, whether the focus is in an interactive item range;

updating, according to the distance calculated in real time, a displacement rate corresponding to the focus when the focus is in the interactive item range; and updating the control instruction according to the updated displacement rate, and controlling, by using the updated control instruction, the simulated object to interact with the interactive item.

20. The non-transitory computer-readable storage medium according to claim 19, wherein the updating, according to the distance calculated in real time, a displacement rate corresponding to the focus comprises:

reducing the displacement rate first and then increasing the displacement rate in a moving direction of the focus when the distance between the focus and the interactive item decreases; or reducing the displacement rate in a moving direction of the focus first and then increasing the displacement rate in a direction opposite to the moving direction when the distance between the focus and the interactive item increases.

\* \* \* \* \*